(12) United States Patent
Luo et al.

(10) Patent No.: US 11,483,883 B2
(45) Date of Patent: Oct. 25, 2022

(54) DUPLICATION MODE COMMUNICATION PROCESSING METHOD IN CU-DU ARCHITECTURE, AND DEVICE

(71) Applicant: HUAWEI TECHNOLOGIES CO., LTD., Guangdong (CN)

(72) Inventors: Haiyan Luo, Shanghai (CN); Xudong Yang, Shanghai (CN); Wenjie Peng, Shanghai (CN); Mingzeng Dai, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 93 days.

(21) Appl. No.: 17/155,798

(22) Filed: Jan. 22, 2021

(65) Prior Publication Data

US 2021/0227600 A1 Jul. 22, 2021

Related U.S. Application Data

(63) Continuation of application No. 16/454,397, filed on Jun. 27, 2019, now Pat. No. 10,925,103, which is a
(Continued)

(30) Foreign Application Priority Data

Jan. 12, 2018 (CN) .......................... 201810032653.6

(51) Int. Cl.
*H04W 76/12* (2018.01)
*H04W 36/00* (2009.01)
(Continued)

(52) U.S. Cl.
CPC ....... *H04W 76/12* (2018.02); *H04W 36/0033* (2013.01); *H04W 36/02* (2013.01);
(Continued)

(58) Field of Classification Search
CPC . H04W 76/12; H04W 36/0033; H04W 36/02; H04W 80/02; H04W 88/085;
(Continued)

(56) References Cited

U.S. PATENT DOCUMENTS

2014/0362790 A1 12/2014 McCann
2015/0373584 A1 12/2015 Hong
(Continued)

FOREIGN PATENT DOCUMENTS

CN 104969489 A 10/2015
CN 106941733 A 7/2017
(Continued)

OTHER PUBLICATIONS

3GPP TS 38.300 V15.0.0 (Release 15), 3rd Generation Partnership Project;Technical Specification Group Radio Access Network, NR and NG-RAN Overall Description, Stage 2, Dec. 2017, 68 pages.
(Continued)

*Primary Examiner* — Mounir Moutaouakil
(74) *Attorney, Agent, or Firm* — Fish & Richardson P.C.

(57) ABSTRACT

Embodiments of this application provide a duplication mode communication processing method in a central unit-distributed unit (CU-DU) architecture. In a possible implementation, in a process of establishing a user plane tunnel between a CU and a DU by exchanging information about uplink tunnel endpoints and information about downlink tunnel endpoints, the DU provides an identity of a primary path to the CU, thereby implementing a duplication mode of a data radio bearer.

30 Claims, 6 Drawing Sheets

Related U.S. Application Data continuation of application No. PCT/CN2019/071563, filed on Jan. 14, 2019.

(51) Int. Cl.
*H04W 36/02* (2009.01)
*H04W 80/02* (2009.01)
*H04W 76/15* (2018.01)
*H04W 88/08* (2009.01)

(52) U.S. Cl.
CPC .......... *H04W 76/15* (2018.02); *H04W 80/02* (2013.01); *H04W 88/085* (2013.01)

(58) Field of Classification Search
CPC ..... H04W 92/12; H04W 76/15; H04W 76/11; H04L 1/08
See application file for complete search history.

(56) References Cited

U.S. PATENT DOCUMENTS

| | | | |
|---|---|---|---|
| 2017/0041943 A1 | 2/2017 | Aminaka et al. | |
| 2017/0181203 A1 | 6/2017 | Shanks et al. | |
| 2018/0098250 A1 | 4/2018 | Vrzic et al. | |
| 2018/0310202 A1 | 10/2018 | Lohr et al. | |
| 2018/0324641 A1 | 11/2018 | Tsai et al. | |
| 2019/0075023 A1 | 3/2019 | Sirotkin | |
| 2019/0075552 A1 | 3/2019 | Yu et al. | |
| 2019/0082482 A1 | 3/2019 | Chen | |
| 2019/0149365 A1 | 5/2019 | Chatterjee et al. | |
| 2019/0349139 A1 | 5/2019 | Park et al. | |
| 2019/0199499 A1 | 6/2019 | Silva et al. | |
| 2019/0215719 A1 | 7/2019 | Wei et al. | |
| 2020/0162211 A1* | 5/2020 | Wang | H04W 72/0426 |
| 2020/0389930 A1* | 12/2020 | Park | H04W 28/0257 |
| 2021/0084539 A1* | 3/2021 | Centonza | H04W 28/12 |

FOREIGN PATENT DOCUMENTS

| | | |
|---|---|---|
| CN | 107342849 A | 11/2017 |
| CN | 107342851 A | 11/2017 |
| RU | 2603626 C2 | 11/2016 |
| WO | 2012175137 A1 | 12/2012 |
| WO | 2018203736 A1 | 11/2018 |
| WO | 2018228557 A1 | 12/2018 |

OTHER PUBLICATIONS

3GPP TS 38.331 V15.0.0 (Release 15),3rd Generation Partnership Project; Technical Specification Group Radio Access Network NR Radio Resource Control (RRC) protocol specification, Dec. 2017, 188 pages.

3GPP Ts 38.470 V1.0.0 (Release 15), 3rd Generation Partnership Project, Technical Specification Group Radio Access Network, NG-RAN,F1 general aspects and principles Dec. 2017, 11 pages.

3GPP TS 38.473 V1.0.0 (Release 15), 3rd Generation Partnership Project; Technical Specification Group Radio Access Network; NG-RAN, F1 application protocol (F1AP), Dec. 2017, 92 pages.

Catt, "Discussion on CA based PDCP Duplication," 3GPP TSG-RAN WG3#98, R3-174533, Reno, NV, USA, Nov. 27-Dec. 1, 2017,12 pages.

Catt, Duplication Activation/Deactivation MAC CE, Aug. 21-25, 2017, 3GPP TSG-RAN WG2 #99, R2-1707921 (Year: 2017).

Extended European Search Report issued in European Application No. 19738568.5 dated Feb. 6, 2020, 9 pages.

Huawei, "pCR to 38.473 on PDCP duplication," 3GPP TSG-RAN WG3 NR Ad-Hoc#1801, R3-180342, Sophia Antipolis, France, Jan. 22-26, 2018, 9 pages.

Huawei, "PDCP duplication for CU-DU," 3GPP TSG RAN WG3 Meeting #97, R3-173128; Berlin, Germany, Aug. 21-25, 2017, 3 pages.

KT Corp.,"Discussion on Inter DU mobility",R2-1712946 3GPP TSG-RAN WG2 #100,Reno, US, Nov. 27-Dec. 1, 2017, 3 pages.

Office Action issued in Chinese Application No. 201910793693.7 dated Apr. 20, 2020, 15 pages.

Office Action issued in Japanese Application No. 2019-543879 dated Sep. 7, 2020, 7 pages (with English translation).

Oppo, Impact of duplication on RLC, Aug. 21, 2017, 3GPP TSG RAN WG2 #99, R2-1707771 (Year: 2017).

PCT International Search Report and Written Opinion in International Application No. PCT/CN2019/071,563, dated Apr. 16, 2019, 10 pages (With Partial English Translation).

Samsung et al., "Bearer management on supporting PDCP duplication in CA case," 3GPP TSG-RAN WG3 Meeting #97, R3-172968; Berlin, Germany, Aug. 21-25, 2017, 4 pages.

Samsung et al., "Discussions on CU-initiated UE context modification procedure over F1," 3GPP TSG-RAN WG3 Meeting #93bis, R3-174616; Prague, Czech, Oct. 9-13, 2017, 10 pages.

Samsung et al.,"Bearer management on supporting PDCP duplication in CA case", R3-172968 3GPP TSG-RAN WG3 Meeting #97 ,Berlin, Germany, Aug. 21-25, 2017, 4 pages.

Samsung et al.,"Further discussions on PDCP duplication in high-layer split" R3-174618 3GPP TSG-RAN WG3 Meeting #98,Reno, USA, Nov. 27-Dec. 1, 2017, 4 pages.

Samsung, Discussion on CA Duplication. 3GPP TSG-RAN WG2 Meeting #99bis Prague, Czech Republic, Oct. 9-13, 2017, R2-1711783, 3 pages.

ZTE Corporation,"Consideration on the ECN in NR",R2-1708149 3GPP TSG RAN WG2 Meeting #99, Berlin, Germany, Aug. 21-25, 2017, 8 pages.

Huawei, (TP for NR BL CR for TS 38.473): on CA-Based SRB duplication, R3-182118, 3GPP TSG-RAN WG3 meeting#99bis, Sanya , China, Apr. 16-20, 2018, 23 pages.

Office Action issued in Japanese Application No. 2019-543879 dated Feb. 8, 2021, 6 pages (with English translation).

Catt, "Discussion on CA based PDCP Duplication," 3GPP TSG-RAN WG3 Meeting #97bis, R3-173593, Prague, Czech Republic, Oct. 9-13, 2017, 12 pages.

EPO Communication pursuant to Article 94(3) EPC issued in European Application No. 19738568.5 dated Mar. 24, 2021, 9 pages.

Office Action issued in Russian Application No. 2019126510/07(051993) dated Feb. 16, 2022, 16 pages (with English translation).

\* cited by examiner sending, by a CU, a first message to a DU, where the first message comprises information indicating at least two uplink tunnel endpoints, for a duplication mode of a data radio bearer, which are on an interface between the CU and the DU; and receiving, by the CU, a second message sent by the DU, where the second message comprises information indicating at least two downlink tunnel endpoints, for the data radio bearer, which are on the interface between the CU and the DU, and an identity of a primary path of the data radio bearer. In an implementation, the at least two downlink tunnel endpoints are in a one-to-one correspondence with the at least two uplink tunnel endpoints.

DUPLICATION MODE COMMUNICATION PROCESSING METHOD IN CU-DU ARCHITECTURE, AND DEVICE

CROSS-REFERENCE TO RELATED APPLICATIONS

This application is a continuation of U.S. patent application Ser. No. 16/454,397, filed on Jun. 27, 2019, which is a continuation of International Application No. PCT/CN2019/071563, filed on Jan. 14, 2019, which claims priority to Chinese Patent Application No. 201810032653.6, filed on Jan. 12, 2018. All of the afore-mentioned patent applications are hereby incorporated by reference in their entireties.

TECHNICAL FIELD

Embodiments of this application relate to the field of radio communications, and in particular, to a duplication mode communication processing technology in a CU-DU architecture.

BACKGROUND

In a radio communications system, various types of data are transmitted between a terminal side device and an access network side device over an uplink and a downlink by using radio bearers (RB), at various protocol layers defined by the 3rd Generation Partnership Project (3GPP) organization. For example, control signaling is transmitted on a signaling radio bearer or service data is transmitted on a data radio bearer. These protocol layers include a physical (PHY) layer, a Media Access Control (MAC) layer, a Radio Link Control (RLC) layer, a Packet Data Convergence Protocol (PDCP) layer, a Radio Resource Control (RRC) layer, and the like.

The access network side device may be further defined, in accordance with the protocol layers, as an architecture including a central unit (CU) and a distributed unit (DU). A control plane connection and a user plane connection are present between the CU and the DU. The user plane connection is also referred to as a user plane tunnel (UP tunnel). One user plane tunnel is determined by one uplink tunnel endpoint on the CU and one downlink tunnel endpoint on the DU. The CU is configured to implement functions of the PDCP layer and functions of the RRC layer, and the DU is configured to implement functions of the PHY layer, functions of the MAC layer, and functions of the RLC layer.

With development of the 5th generation communications technologies, for one radio bearer, one PDCP entity at the PDCP layer corresponds to at least two RLC entities at the RLC layer. Some or all data on the one PDCP entity is transmitted on the at least two RLC entities in duplicate. Such a processing mode is referred to as duplication. One duplication mode is specific to one radio bearer.

How to implement a duplication mode for a radio bearer in a CU-DU architecture is an urgent problem to be resolved.

SUMMARY

Embodiments of this application provide a duplication mode communication processing method in a CU-DU architecture, to establish a CU-DU connection in a duplication mode.

A first aspect of the embodiments of this application provides a duplication mode communication processing method in a CU-DU architecture, including the following content:

By applying the technical solution provided in the first aspect, in a process of establishing at least two user plane tunnels between the CU and the DU by exchanging information about uplink tunnel endpoints and information about downlink tunnel endpoints, the DU provides the identity of the primary path to the CU, so that the CU and the DU learn which user plane tunnel is corresponding to the primary path, and further can establish a connection between the primary path and the user plane tunnel corresponding to the primary path. In this way, a duplication mode is implemented for a data radio bearer from a CU to a DU.

In the first aspect, the first message comprises information indicating the at least two uplink tunnel endpoints (indicating a need to establish at least two user plane tunnels), and therefore the DU may consider by default to configure the duplication mode of the data radio bearer.

In the first aspect, either the CU or the DU can determine which user plane tunnel is corresponding to the primary path, but the identity of the primary path is notified to the CU by the DU by using the second message.

Based on the first aspect, in a first possible implementation of the first aspect, the first message further comprises information instructing to configure the duplication mode of the data radio bearer. By applying the solution provided in the first possible implementation, the CU uses the first message to explicitly instruct the DU that the duplication mode of the data radio bearer needs to be configured.

Based on the first aspect or the first possible implementation of the first aspect, in a second possible implementation of the first aspect, the identity of the primary path is an identity, indicated by information comprised in the second message, of a path corresponding to only one of the at least two downlink tunnel endpoints. In the second possible implementation of the first aspect, the DU may notify an identity of a path corresponding to only one downlink tunnel endpoint, and thus the identity of the path corresponding to the only one downlink tunnel endpoint is the identity of the primary path.

Based on any one of the first aspect to the second possible implementation of the first aspect, in a third possible implementation of the first aspect, the first message further comprises information indicating an uplink tunnel endpoint of the at least two uplink tunnel endpoints that corresponds to the primary path; or the second message further comprises information indicating a downlink tunnel endpoint of the at least two downlink tunnel endpoints that corresponds to the primary path; or an uplink tunnel endpoint of the at least two uplink tunnel endpoints that corresponds to the primary path is protocol-predefined; or a downlink tunnel endpoint of the at least two downlink tunnel endpoints that corresponds to the primary path is protocol-predefined.

In the third possible implementation of the first aspect, a user plane tunnel corresponding to the primary path may be specified by the CU or the DU or in protocol-predefined manner.

Based on any one of the first aspect to the third possible implementation of the first aspect, in a fourth possible implementation of the first aspect, the method further includes: notifying, by the CU, the identity of the primary path of the data radio bearer to a terminal side device through the DU.

The fourth possible implementation of the first aspect enables the terminal side device to learn of the primary path, so that a primary path is determined for the CU, the DU, and the terminal side device.

A second aspect of the embodiments of this application provides a duplication mode communication processing method in a CU-DU architecture, including the following content:

sending, by a CU to a DU, an identity of a signaling radio bearer and instruction information used to instruct to configure a duplication mode of the signaling radio bearer; and receiving, by the CU, configuration of the duplication mode of the signaling radio bearer and an identity of a primary path of the signaling radio bearer that are sent by the DU.

By applying the technical solution provided in the second aspect, the DU can configure the signaling radio bearer under the instruction of the CU, so that the CU learns of the primary path of the signaling radio bearer.

Based on the second aspect, in a first possible implementation of the second aspect, the method further includes: sending, by the CU, a CU-DU interface message to the DU, where when the duplication mode of the signaling radio bearer is inactive, the CU-DU interface message includes one RRC message belonging to the signaling radio bearer; or when the duplication mode of the signaling radio bearer is active, the CU-DU interface message includes at least two RRC messages with a same PDCP serial number that belong to the signaling radio bearer.

The first possible implementation of the second aspect provides an implementation of RRC message sending by the CU when the duplication mode is active or inactive.

Based on the second aspect, in a second possible implementation of the second aspect, the method further includes: sending, by the CU, a CU-DU interface message to the DU, where the CU-DU interface message includes at least one RRC message and an identity of a path to which each of the at least one RRC message is sent.

The second possible implementation of the second aspect provides another implementation of RRC message sending by the CU, and the DU may determine sending of each RRC message based on the identity of the path to which the RRC message is sent.

Based on the second aspect, in a third possible implementation of the second aspect, the method further includes:

notifying, by the CU, the identity of the primary path of the signaling radio bearer to a terminal side device through the DU.

The third possible implementation of the second aspect enables the terminal side device to learn of the primary path, so that a primary path is determined for the CU, the DU, and the terminal side device.

A third aspect of the embodiments of this application provides a duplication mode communication processing method in a CU-DU architecture, including the following content:

receiving, by a DU, a first message sent by a CU, where the first message comprises information indicating at least two uplink tunnel endpoints, for a duplication mode of a data radio bearer, which are on an interface between the CU and the DU; and sending, by the DU, a second message to the CU, where the second message comprises information indicating at least two downlink tunnel endpoints, for the data radio bearer, which are on the interface between the CU and the DU, and an identity of a primary path of the data radio bearer. In an implementation, the at least two downlink tunnel endpoints are in a one-to-one correspondence with the at least two uplink tunnel endpoints.

The third aspect corresponds to the first aspect, and has beneficiary effects similar to those of the first aspect.

Based on the third aspect, in a first possible implementation of the third aspect, the first message further comprises information instructing to configure the duplication mode of the data radio bearer. The first possible implementation of the third aspect corresponds to the first possible implementation of the first aspect, and has beneficiary effects similar to those of the first possible implementation of the first aspect.

Based on the third aspect or the first possible implementation of the third aspect, in a second possible implementation of the third aspect, the identity of the primary path is an identity, indicated by information comprised in the second message, of a path corresponding to only one of the at least two downlink tunnel endpoints. The second possible implementation of the third aspect corresponds to the second possible implementation of the first aspect, and has beneficiary effects similar to those of the second possible implementation of the first aspect.

Based on any one of the third aspect to the second possible implementation of the third aspect, in a third possible implementation of the third aspect, the first message further comprises information indicating an uplink tunnel endpoint of the at least two uplink tunnel endpoints that corresponds to the primary path; or the second message further comprises information indicating a downlink tunnel endpoint of the at least two downlink tunnel endpoints that corresponds to the primary path; or an uplink tunnel endpoint of the at least two uplink tunnel endpoints that corresponds to the primary path is protocol-predefined; or a downlink tunnel endpoint of the at least two downlink tunnel endpoints that corresponds to the primary path is protocol-predefined.

The third possible implementation of the third aspect corresponds to the third possible implementation of the first aspect, and has beneficiary effects similar to those of the third possible implementation of the first aspect.

A fourth aspect of the embodiments of this application provides a duplication mode communication processing method in a CU-DU architecture, including the following content:

receiving, by a DU, an identity of a signaling radio bearer and instruction information used to instruct to configure a duplication mode of the signaling radio bearer that are sent by a CU; and sending, by the DU to the CU, configuration of the duplication mode of the signaling radio bearer and an identity of a primary path of the signaling radio bearer.

The fourth aspect corresponds to the second aspect, and has beneficiary effects similar to those of the second aspect.

Based on the fourth aspect, in a first possible implementation of the fourth aspect, the method further includes:

receiving, by the DU, a CU-DU interface message sent by the CU, where when the duplication mode of the signaling radio bearer is inactive, the CU-DU interface message includes one RRC message belonging to the signaling radio bearer, and the DU sends the one RRC message to a terminal side device through the primary path; or when the duplication mode of the signaling radio bearer is active, the CU-DU interface message includes at least two RRC messages with a same PDCP serial number that belong to the signaling radio bearer, and the DU sends the at least two RRC messages to the terminal side device through the primary path and at least one secondary path, respectively.

The first possible implementation of the fourth aspect corresponds to the first possible implementation of the second aspect, and has beneficiary effects similar to those of the first possible implementation of the second aspect.

Based on the fourth aspect, in a second possible implementation of the fourth aspect, the method further includes:

receiving, by the DU, a CU-DU interface message sent by the CU, where the CU-DU interface message includes at least one RRC message and an identity of a path to which each of the at least one RRC message is sent.

The second possible implementation of the fourth aspect corresponds to the second possible implementation of the second aspect, and has beneficiary effects similar to those of the second possible implementation of the second aspect.

Based on the fourth aspect, in a third possible implementation of the fourth aspect, the method further includes:

receiving, by the DU, a CU-DU interface message sent by the CU, where the CU-DU interface message includes an RRC message, where if a PDCP serial number of the RRC message is duplicated, the DU sends the RRC message to a terminal side device through a secondary path; or if a PDCP serial number of the RRC message is not duplicated, the DU sends the RRC message to a terminal side device through the primary path.

By applying the third possible implementation of the fourth aspect, the DU can determine whether a PDCP serial number of a received RRC message is duplicated, so as to determine whether to send the RRC message to the primary path or a secondary path.

A fifth aspect of the embodiments of this application provides an access network side device, and the access network side device includes a receiving unit and a sending unit. The receiving unit is configured to execute the receiving action in the first aspect, the second aspect, the third aspect, the fourth aspect, or the possible implementations thereof, and the sending unit is configured to execute the sending action in the first aspect or the possible implementations thereof.

The access network side device provided in the fifth aspect may be a standalone CU or a standalone DU, or may be a chip system in the CU or a chip system in the DU. The chip system includes a processor consisting of at least one gating circuit and a memory consisting of at least one gating circuit. Each gating circuit includes at least one transistor (for example, a field effect transistor) connected by conducting wires. Each transistor is made of a semiconducting material. Further, the receiving unit and the sending unit are respectively a receiving circuit and a sending circuit in a specific implementation. The access network side device may further include other electronic lines, for example, lines used to connect the receiving circuit and the sending circuit and a radio frequency antenna used for signal sending. The technical solution provided in the fifth aspect has technical effects equivalent to those of the foregoing corresponding implementations. For details, refer to the foregoing implementations.

A sixth aspect of the embodiments of this application provides a computer storage medium. The computer storage medium includes program code, and the program code is used to implement the technical solution provided in the first aspect, the second aspect, the third aspect, the fourth aspect, or the possible implementations thereof. The technical solution provided in the sixth aspect has technical effects equivalent to those of the foregoing corresponding implementations. For details, refer to the foregoing implementations.

A seventh aspect of the embodiments of this application provides a communications system. The communications system includes a CU and a DU. The CU is configured to implement the method in the first aspect, the second aspect, or the possible implementations thereof, and the DU is configured to implement the technical solution provided in the third aspect, the fourth aspect, or the possible implementations thereof. The technical solution provided in the seventh aspect has technical effects equivalent to those of the foregoing corresponding implementations. For details, refer to the foregoing implementations.

DESCRIPTION OF EMBODIMENTS

Figure 1:
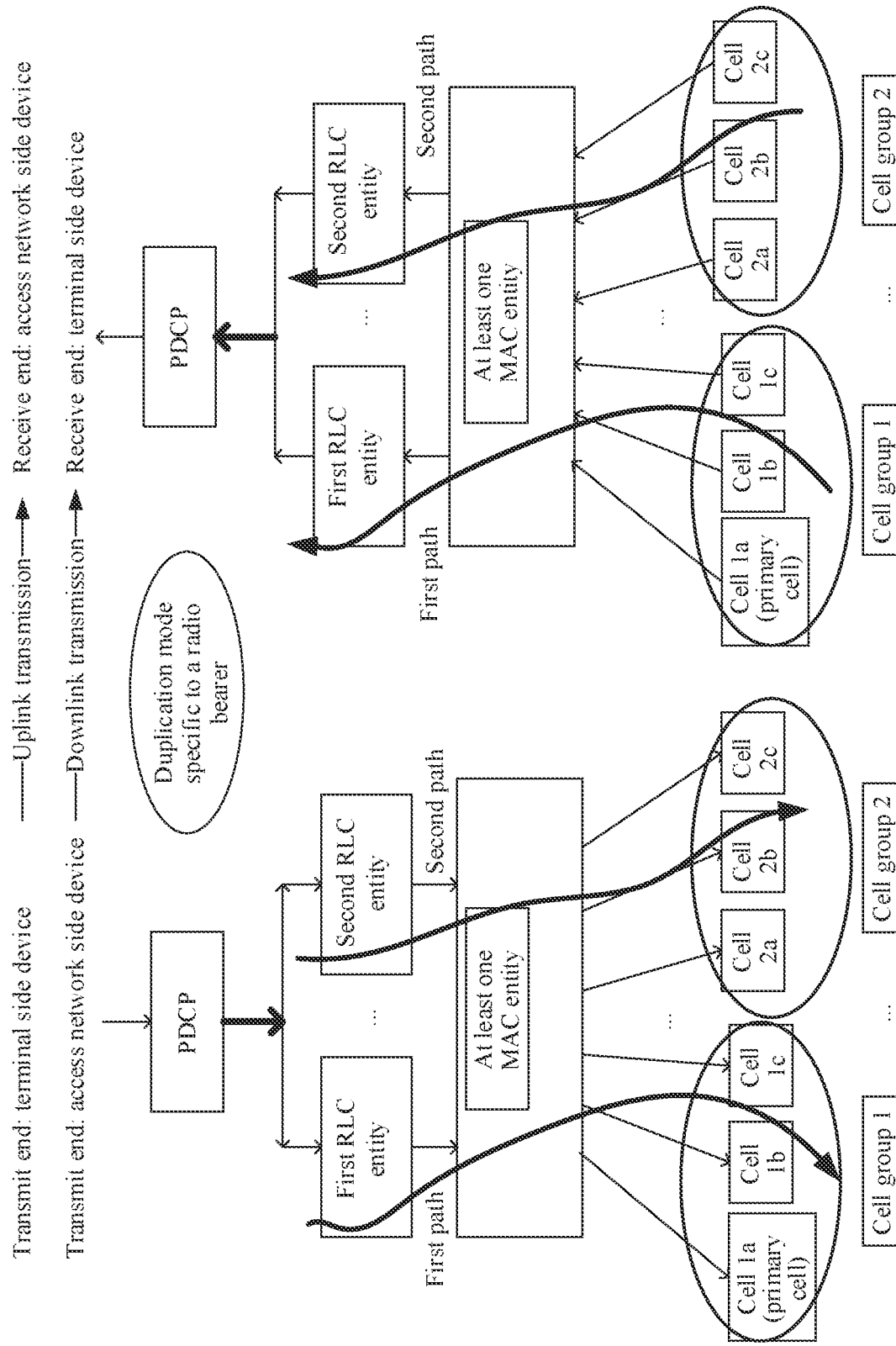
FIG. 1 is a schematic architectural diagram of a duplication mode specific to a radio bearer according to an embodiment of this application.

In a schematic architectural diagram of a radio communications system protocol stack shown in FIG. 1, a radio communications system includes a terminal side device and an access network side device.

The terminal side device may be a standalone terminal or a chip system in the terminal. The terminal, also referred to as user equipment (UE) or a mobile station, includes mobile phones, handheld Internet of Things devices, wearable devices, and the like.

The access network side device may be a standalone radio access device or a chip system in a radio access device. The radio access device may be a base station or a wireless local area network access point, and includes an RRC layer, a PDCP layer, an RLC layer, a MAC layer, a PHY layer, and the like. Base stations may be classified into two types: macro base stations and small base stations. Small base stations are further classified into micro base stations, pico base stations, and the like. The wireless local area network access point may be a router, a switch, or the like. The wireless local area network access point may provide Wireless Fidelity (Wi-Fi) signal coverage.

At least one radio bearer (RB) is established between the terminal side device and the access network side device to transmit data. The data may include signaling data or service data. A radio bearer mainly used for signaling data transmission is a signaling radio bearer (SRB), and a radio bearer mainly used for service data transmission is a data radio bearer (DRB). The service data includes enhanced mobile broadband (eMBB) data, massive machine-type communications (mMTC) data, ultra-reliable low-latency communications (URLLC) data, and the like.

In the radio communications system architectural diagram shown in FIG. 1, for uplink transmission, a transmit end is the terminal side device, and a receive end is the access network side device; and for downlink transmission, a transmit end is the access network side device, and a receive end is the terminal side device.

For a radio bearer between a transmit end and a receive end, a duplication mode of the radio bearer includes configuration of a corresponding set of protocol layer entities between the transmit end and the receive end. This set of protocol layer entities includes one PDCP entity, at least two RLC entities corresponding to the PDCP entity, at least one MAC entity corresponding to the at least two RLC entities, and at least one PHY entity corresponding to the at least one MAC entity. For a signaling radio bearer, the set of protocol layer entities further includes one RRC entity corresponding to the PDCP entity. Optionally, for a data radio bearer, the set of protocol layer entities may further include one SDAP (SDAP) entity, at an SDAP layer, corresponding to the PDCP entity.

In FIG. 1, in a duplication mode of one radio bearer, a path is established between each RLC entity and a MAC entity. An identity of the RLC entity may be used to indicate the path. Correspondingly, an identity of the path may be used to indicate the RLC entity. Therefore, the identity of the path and the identity of the RLC entity are interchangeable. In some technical literature, a path in the duplication mode is also referred to as a leg.

Optionally, in a duplication mode of one radio bearer, different paths are different logical channels with different logical channel identities. Therefore, the radio bearer corresponds to at least two logical channels. The two logical channels may belong to one logical channel group (LCG) or different logical channel groups.

Optionally, in a duplication mode of one radio bearer, at least two paths belong to one logical channel, and have a same logical channel identity. Therefore, the radio bearer corresponds to one logical channel. In this case, to distinguish between different paths, different paths may have a same logical channel identity but different path identities.

In FIG. 1, in a duplication mode of one radio bearer, a transmit end and a receive end both include at least one PDCP entity, a first RLC entity corresponding to the one PDCP entity, and a second RLC entity corresponding to the one PDCP entity. The first RLC entity corresponds to a first path, and the second RLC entity corresponds to a second path. The transmit end sends, to the receive end, data on the first path in a cell 1b or cell group 1 that corresponds to the first path, and the receive end receives, in the cell 1b or cell group 1 that corresponds to the first path, the data on the first path sent by the transmit end. The transmit end sends, to the receive end, data on a second path in a cell 2b or cell group 2 that corresponds to the second path, and the receive end receives the data on the second path in the cell 2b or cell group 2 that corresponds to the second path. After the duplication mode is activated, data from the one PDCP entity is transmitted on the second RLC entity of the transmit end and the first RLC entity of the transmit end in duplicate. For example, after duplicating the data, the PDCP entity sends the data to both the first RLC entity and the second RLC entity for transmission in duplicate; or after one RLC entity of the first RLC entity and the second RLC entity duplicates the data, the one RLC entity and the other RLC entity transmit the data in duplicate.

In a CU-DU architecture in which a carrier aggregation technology is further introduced, a path corresponding to a primary cell group (a cell set including a primary cell) is a primary path, and correspondingly an RLC entity on the primary path is a primary RLC entity; and a path corresponding to a secondary cell group (a cell set including only at least one secondary cell) is a secondary path, and correspondingly an RLC entity on the secondary path is a secondary RLC entity.

Optionally, the access network side device may include a primary path information element into a PDCP configuration of a radio bearer sent to the terminal side device, the primary path information element containing a cell group identity (CellGroupId) and a path identity corresponding to the cell group identity. And thus, a cell group indicated by the cell group identity is a primary cell group and a path indicated by the path identity is the primary path. A path not indicated in the primary path information element is a secondary path of the radio bearer, and a cell group not indicated in the primary path information element is a secondary cell group.

Figure 2A:
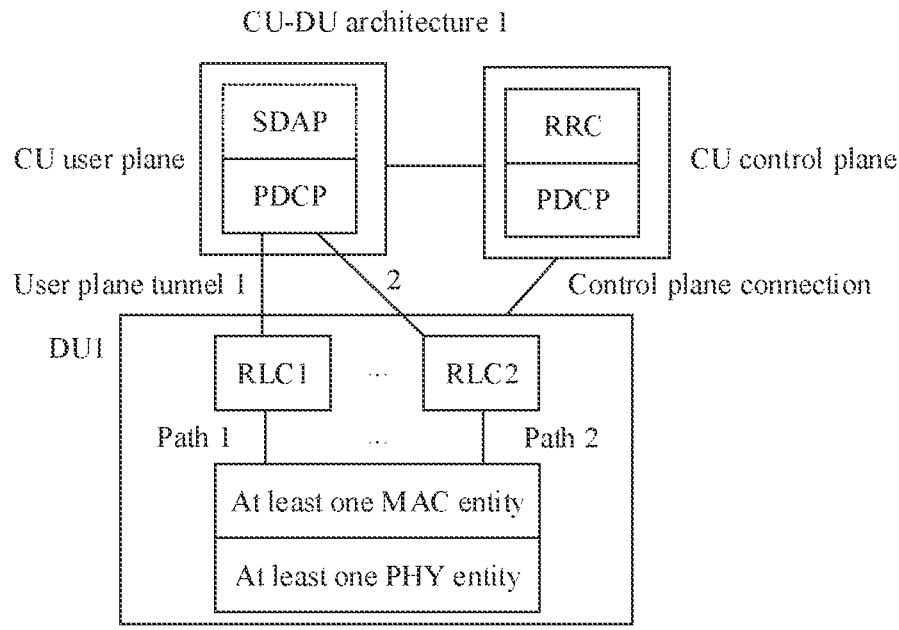
FIG. 2A to FIG. 2C are schematic structural diagrams of a duplication mode in a CU-DU architecture according to an embodiment of this application.
Figure 2B:
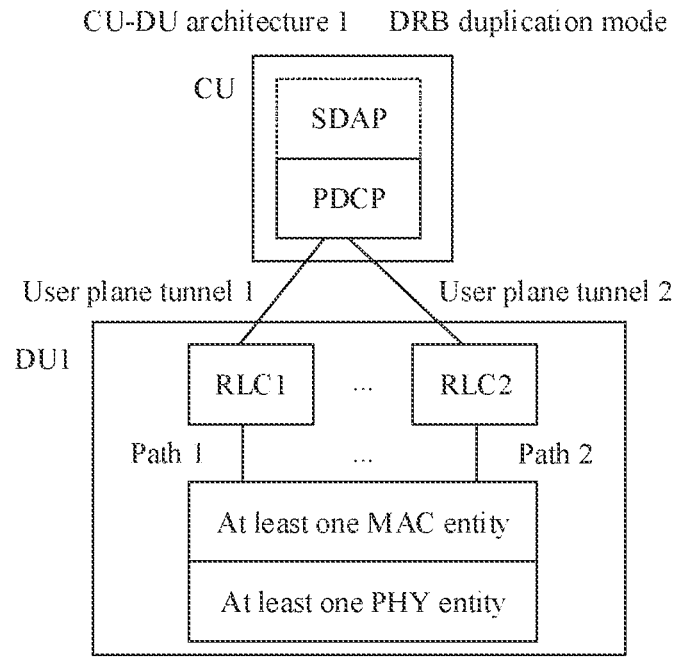
Figure 2C:
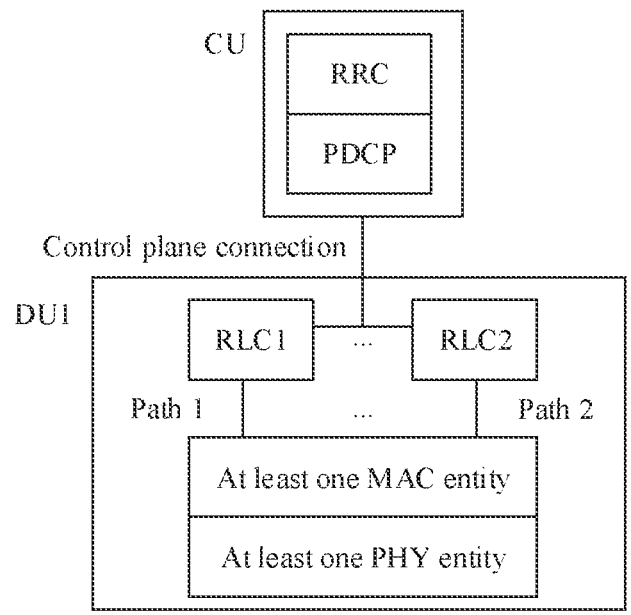
Figure 3A:
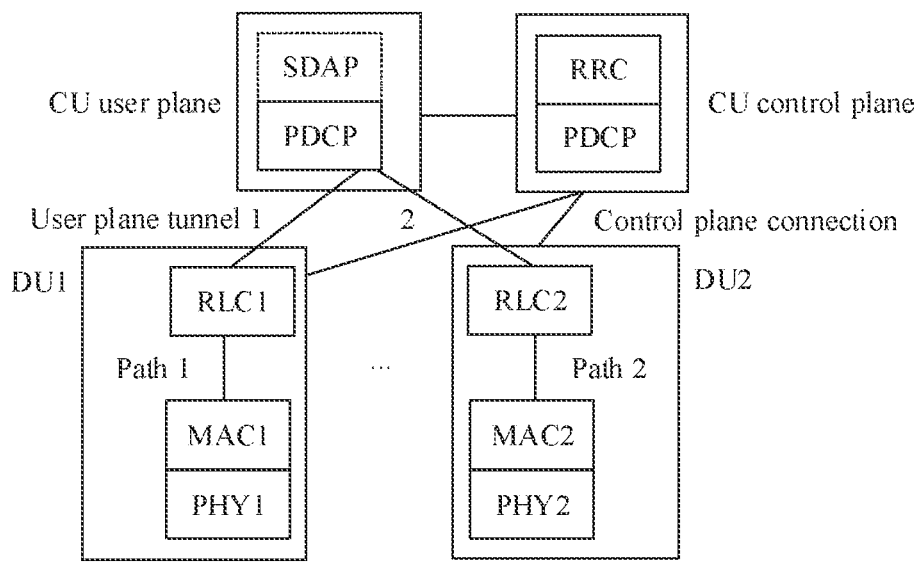
FIG. 3A to FIG. 3C are other schematic structural diagrams of a duplication mode in a CU-DU architecture according to an embodiment of this application.
Figure 3B:
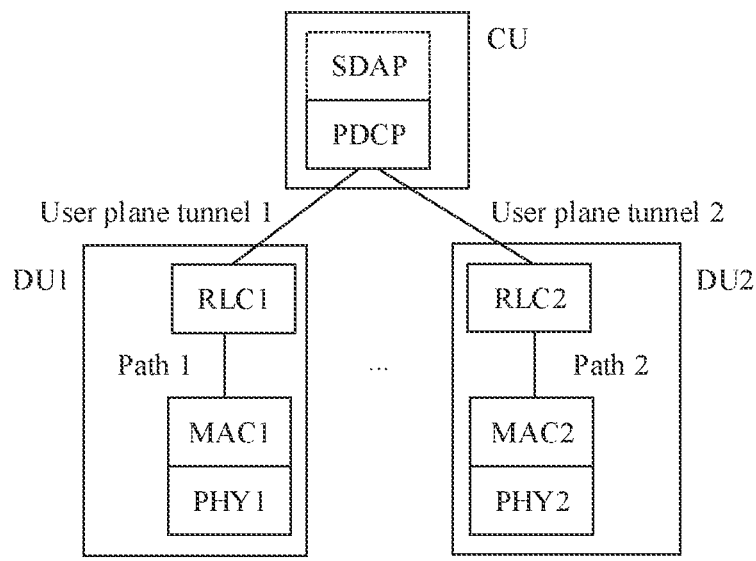
Figure 3C:
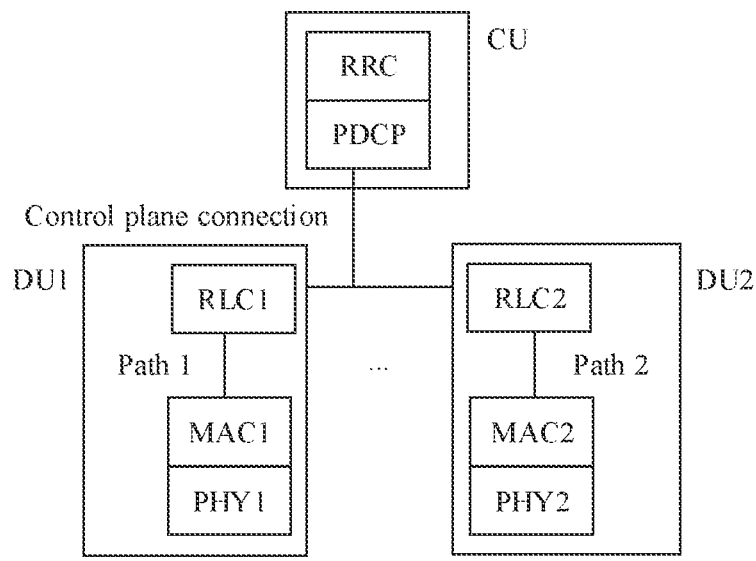

As shown in FIG. 2A to FIG. 2C and FIG. 3A to FIG. 3C, when an access network side device is a CU-DU architecture, a PDCP layer locates in a CU while an RLC layer, a MAC layer, and a PHY layer locates in a DU. Therefore, various data that is sent from the PDCP layer to the RLC layer is sent from the CU to the DU. In FIG. 2A to FIG. 2C, in a duplication mode of one radio bearer, at least two RLC entities locate in one DU. In FIG. 3A to FIG. 3C, in a duplication mode of one radio bearer, two RLC entities of at least two RLC entities locate in different DUs.

Connections between the CU and the DU include: a CU-DU control plane connection used for SRB, DRB, and user context setup, and a CU-DU user plane connection used for service data transmission on a DRB. Due to use of a General Packet Radio Service (GPRS) tunnel protocol, the CU-DU user plane connection is also referred to as a user plane tunnel. A user plane tunnel is a path between an uplink tunnel endpoint and a downlink tunnel endpoint that is in a one-to-one correspondence with the uplink tunnel endpoint. After being established, a user plane tunnel may be identified by an uplink tunnel endpoint or a downlink tunnel endpoint of the user plane tunnel.

When the access network side device is the CU-DU architecture, transmission from the DU to the CU is uplink transmission, and transmission from the CU to the DU is downlink transmission. In some technical literature, a CU-DU connection is referred to as an F connection, a CU-DU user plane connection is an F1-U connection, and a CU-DU control plane connection is an F1-C connection. Correspondingly, the CU may include a CU user plane and a CU control plane, and a connection between the CU user plane and the CU control plane is referred to as an E1 connection in some literature.

Optionally, in FIG. 3A to FIG. 3C, when the CU determines to configure a duplication mode of a radio bearer, the CU instructs a DU including at least one RLC entity in the duplication mode of the radio bearer, to determine whether the duplication mode can be activated or deactivated for the radio bearer. The DU that receives the notification determines, based on a signal measurement result or other information, whether to activate or deactivate the duplication mode of the radio bearer, and instruct, by using a MAC layer message, a terminal side device to activate or deactivate the duplication mode of the radio bearer.

Optionally, in FIG. 3A to FIG. 3C, when a CU determines whether to activate or deactivate the duplication mode of the radio bearer, the CU notifies all DUs (for example, including at least a DU1 and a DU2) including RLC entities in the duplication mode of the radio bearer, that the duplication mode of the radio bearer is activated or deactivated.

Optionally, in FIG. 3A to FIG. 3C, when a DU determines whether to activate the duplication mode of the radio bearer, the DU notifies the CU and other DUs including other RLC entities that the duplication mode of the radio bearer is activated or deactivated.

In the following embodiments of this application, how a duplication mode of a data radio bearer is implemented in a CU-DU architecture and how a duplication mode of a signaling radio bearer is implemented in a CU-DU architecture are described separately.

Figure 4:
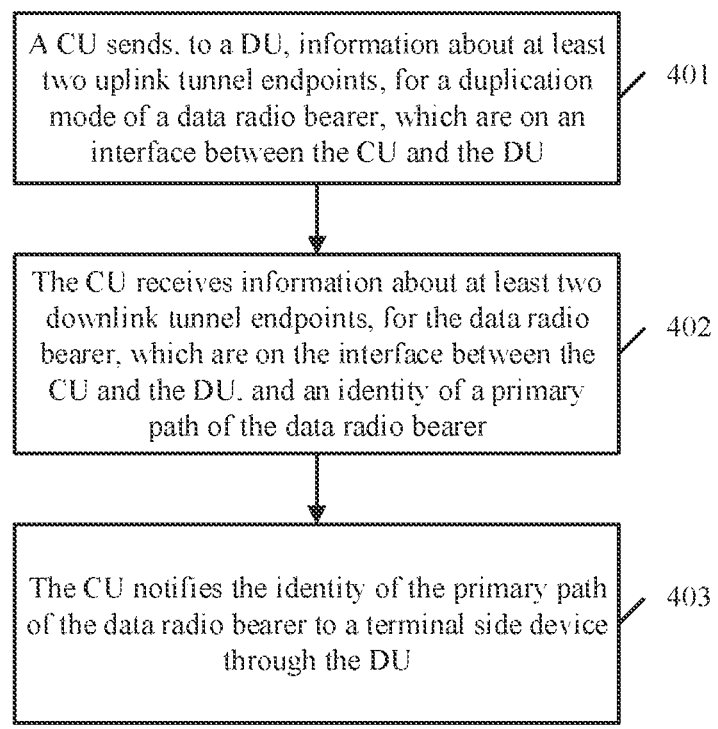
FIG. 4 is a schematic flowchart of a duplication mode communication processing method in a CU-DU architecture according to an embodiment of this application.

A first embodiment of this application provides a communication processing method in a CU-DU architecture, applied to a duplication mode scenario of a data radio bearer (DRB) in a CU-DU architecture. FIG. 4 is a schematic flowchart of the communication processing method. The first embodiment of this application includes the following contents.

401. A CU sends a first message to a DU, where the first message comprises information indicating at least two uplink tunnel endpoints, for a duplication mode of a data radio bearer, which are on an interface between the CU and the DU.

The CU may determine that the duplication mode of the data radio bearer needs to be configured, and sends the first message (for example, a UE context setup/modification request) to the DU on the CU-DU interface. The CU may carry the information indicating the at least two uplink tunnel endpoints and an identity of the data radio bearer into the first message. The information indicating the at least two uplink tunnel endpoints includes an address, for example, an Internet Protocol (IP) address, of each of the at least two uplink tunnel endpoints, and an identifier, for example, a tunnel endpoint identifier (TEID), of each of the at least two uplink tunnel endpoints.

In an optional implementation, a structure of the first message at the CU-DU interface is as follows:

```
UE context setup/modification request
{...
    DRBs to be setup list
        >DRB ID
        >Tunnels to be setup list
            >>Tunnels setup Item IEs
                >>>PathIdentity           Optionalor mandatory
                >>>UL Tunnel Endpoint     Mandatory
...}
```

402. The CU receives a second message sent by the DU, where the second message comprises information indicating at least two downlink tunnel endpoints for the data radio bearer, which are on the interface between the CU and the DU, and an identity of a primary path of the data radio bearer. In an implementation, the at least two downlink tunnel endpoints are one-to-one corresponding to the at least two uplink tunnel endpoints.

After the DU receives the first message, because an identity of a single data radio bearer corresponds to the information indicating the at least two uplink tunnel endpoints in the first message, the DU can learn, from the first message, that the duplication mode of the data radio bearer needs to be configured. Optionally, the first message may further carry instruction information, where the instruction information explicitly instructs that the duplication mode of the data radio bearer needs to be configured. The DU learns, from the instruction of the first message, that the duplication mode of the data radio bearer needs to be configured.

In 402, the DU sends the second message (for example, a UE context setup/modification response) to the CU on the CU-DU interface, to establish at least two CU-DU user plane tunnels on the interface between the CU and the DU, for the duplication mode of the data radio bearer. In an implementation, the DU may carry the information indicating the at least two downlink tunnel endpoints into the second message, where the at least two downlink tunnel endpoints are one-to-one corresponding to the at least two uplink tunnel endpoints. The information indicating the at least two downlink tunnel endpoints includes addresses (for example, Internet Protocol addresses) of the at least two downlink tunnel endpoints and an identifier (for example, a TEID) of each of the at least two downlink tunnel endpoints. To further make CU-DU user plane tunnel endpoints correspond to paths respectively corresponding to at least two RLC entities on the DU, the second message further comprises information indicating an identity of a path corresponding to each of at least one of the at least two downlink tunnel endpoints. Optionally, the second message further comprises information indicating a cell group corresponding to a path corresponding to each of at least one of the at least two downlink tunnel endpoints. In this way, the CU can learn of a correspondence among any combination of: an uplink tunnel endpoint, a downlink tunnel endpoint, a path, and a cell group in the duplication mode.

In a possible implementation, after a control plane of the CU determines that the duplication mode of the data radio bearer needs to be configured, the control plane of the CU configures the information indicating the at least two uplink tunnel endpoints, carries the information into the first message, and sends the first message to the DU through a CU-DU control plane connection. The control plane of the CU further sends the information indicating the at least two uplink tunnel endpoints to a user plane of the CU.

In another possible implementation, when a user plane of the CU determines that the duplication mode of the data radio bearer needs to be configured, the user plane of the CU allocates information about the at least two uplink tunnel endpoints, and sends the information about the at least two uplink tunnel endpoints to a control plane of the CU. The control plane of the CU carries the information indicating the at least two uplink tunnel endpoints into the first message, and sends the first message through a CU-DU control plane connection. Further, after the control plane of the CU receives the information about the at least two downlink tunnel endpoints, notified by the DU in the second message, the control plane notifies the information indicating the at least two downlink tunnel endpoints to the user plane of the CU. Optionally, the control plane of the CU receives, on a CU-DU control plane interface, the second message sent by the DU.

Through 401 and 402, one user plane tunnel between one uplink tunnel endpoint and one corresponding downlink tunnel endpoint is established between the CU and the DU.

In the duplication mode, at least two user plane tunnels are established between the CU and the DU.

Optionally, the second message comprises information indicating that the primary path corresponds to a certain one of the at least two downlink tunnel endpoints, so that a user plane tunnel to which this certain one downlink tunnel endpoint belongs corresponds to the primary path, and other user plane tunnels correspond to secondary paths. For example, the DU indicates in the second message a downlink tunnel endpoint 1 corresponding to a data radio bearer and a downlink tunnel endpoint 2 that correspond to the data radio bearer, and indicates a path identity associated with the downlink tunnel endpoint 1. Therefore, the path identity associated with the downlink tunnel endpoint 1 is the identity of the primary path. In this case, the certain one downlink tunnel endpoint may be referred to as a primary tunnel endpoint. When the duplication mode is deactivated, the CU and the DU transmit service data on the primary tunnel endpoint through the primary path corresponding to the primary tunnel endpoint, rather than transmit the service data on other tunnel endpoints through paths corresponding to the other tunnel endpoints.

In an alternative implementation to replace 401 and 402, the primary path may be determined by the CU, and indicated in the first message to be sent to the DU. In this case, the second message may not carry the identity of the primary path. Regardless of whether the identity of the primary path is carried in the first message or the second message, it is clear to the CU and the DU knows which user plane tunnel corresponds to the primary path. In this way, a connection between a user plane tunnel and the primary path is established in the duplication mode. Correspondingly, a connection between another user plane tunnel and a secondary path may be established.

Optionally, the second message may include identities of at least two paths respectively corresponding to the at least two downlink tunnel endpoints. The identities of the at least two paths include the identity of the primary path. To make the CU learn which one of the at least two paths is the primary path, the second message not only includes the identities of the at least two paths, but also specifically indicates which path is the primary path.

Optionally, the second message may include an identity of a path corresponding to a certain one of the at least two downlink tunnel endpoints. In this case, in the second message, because only one downlink tunnel endpoint corresponds to a path, the CU can learn that the path corresponding to this downlink tunnel endpoint is the primary path. Optionally, the second message may explicitly indicate that the identity of the path corresponding to the downlink tunnel endpoint is the identity of the primary path.

Optionally, which one of the at least two downlink tunnel endpoints or which one of the at least two uplink tunnel endpoints corresponding to the primary path is predefined by a protocol. In one possible implementation, a certain one of the at least two uplink tunnel endpoints or a certain one downlink tunnel endpoint is predefined to corresponds to a path, without indicating paths corresponding to any other tunnel endpoints. In this case, the CU and the DU learn, from the protocol predefinition, that the path corresponding to the predefined uplink tunnel endpoint or the predefined downlink tunnel endpoint is the primary path. In another possible implementation, the second message indicates identities of paths respectively corresponding to all of the at least two downlink tunnel endpoints, and the CU and the DU learn, from the protocol predefinition, that a path corresponding to the predefined downlink tunnel endpoint is the primary path.

In a possible implementation, an uplink tunnel endpoint first appearing in a tunnel-to-be-setup list corresponding to the data radio bearer identity in the first message corresponds to the primary path. For example, the list includes an uplink tunnel endpoint 1 and an uplink tunnel endpoint 2, and therefore the uplink tunnel endpoint 1 corresponds to the primary path. When the DU sends the second message, a first user plane tunnel is established by using a downlink tunnel endpoint firstly appearing in the tunnels-to-be-setup list and an uplink tunnel endpoint first appearing in the first message, where the user plane tunnel corresponds to the primary path. For example, the DU indicates in the second message the identity of the data radio bearer correspond to the downlink tunnel endpoint 1 and the downlink tunnel endpoint 2. The downlink tunnel endpoint 1 and the uplink tunnel endpoint 1 implement the first user plane tunnel, and this user plane tunnel is associated with the primary path. In other words, a path identity corresponding to the downlink tunnel endpoint 1 is the identity of the primary path. For example, the downlink tunnel endpoint identity 1 corresponds to a logical channel identity 1, and therefore the logical channel identity 1 is the identity of the primary path.

Optionally, the CU may indicate, in the first message, which one of the at least two uplink tunnel endpoints needs to corresponds to the primary path (the CU does not know the identity of the primary path at that time, though). For example, the CU specifies that the uplink tunnel endpoint 1 corresponds to the primary path. Then, the DU learns that the uplink tunnel endpoint 1 needs to be corresponding to the primary path, and therefore the identity of the primary path corresponding to the uplink tunnel endpoint 1 is indicated in the second message. For example, the DU includes information about the downlink tunnel endpoint 1 and information about the downlink tunnel endpoint 2 into the second message. The downlink tunnel endpoint 1 corresponds to the uplink tunnel endpoint 1, and therefore a user plane tunnel 1 is established. The downlink tunnel endpoint 2 corresponds to an uplink tunnel endpoint 2, and therefore a user plane tunnel 2 is established. The DU learns, from the indication of the CU, that the downlink tunnel endpoint 1 corresponding to the uplink tunnel endpoint 1 needs to corresponds to the primary path, and further associates the identity of the primary path with the downlink tunnel endpoint 1, carries the identity of the primary path into the second message, and sends the second message to the CU, so that the CU learns of the identity of the primary path. For example, the CU parses the second message to get to know that the downlink tunnel endpoint 1 corresponds to the uplink tunnel endpoint 1, and the identity of the path associated with the downlink tunnel endpoint 1 is the identity of the primary path.

Optionally, the DU may determine which one of the at least two downlink tunnel endpoints needs to correspond to the primary path, and indicates, in the second message, the downlink tunnel endpoint corresponding to the primary path among the at least two downlink tunnel endpoints. For example, the DU includes the downlink tunnel endpoint 1 and the downlink tunnel endpoint 2 that correspond to the data radio bearer into the second message, and indicates that the downlink tunnel endpoint 1 is the primary path. Then, an identity of a path associated with the downlink tunnel endpoint 1 is the identity of the primary path.

Optionally, the method further includes: 403, the CU notifies the identity of the primary path of the data radio bearer to a terminal side device through the DU. The CU may further notify an identity of a cell group (namely, a primary cell group) corresponding to the primary path to the terminal side device. Content notified by the CU in 403 may be carried in a PDCP configuration of the data radio bearer. After receiving the PDCP configuration, the DU passes-through the PDCP configuration to the terminal side device. When the CU includes a control plane of the CU and a user plane of the CU, the control plane of the CU may complete the PDCP layer configuration, or that the user plane of the CU may complete the PDCP layer configuration and notifies the PDCP layer configuration to the control plane of the CU.

For example, the CU obtains a cell group configuration (CellGroupConfig) included in the second message sent by the DU, and obtains a cell group identity (CellGroupId) from the configuration. Particularly, the cell group identity may be presented as an individual information element in the second message, and therefore the CU does not need to obtain the cell group identity by reading the cell group configuration. The CU uses the foregoing method to obtain the identifier of the primary path, for example, a logical channel identity of the primary path. The CU adds the cell group identity and the identity of the primary path into the PDCP configuration.

Optionally, the control plane of the CU sends, to the user plane of the CU, the obtained cell group identity and the identity of the primary path, together with a corresponding data radio bearer identity. The user plane of the CU writes the cell group identity and the identity of the primary path into the PDCP configuration. The user plane of the CU sends the PDCP configuration to the control plane of the CU, so that the control plane of the CU sends the PDCP configuration to the terminal side device through the DU.

In an example, the CU determines to configure a duplication mode of a DRB1 of the terminal side device. Then, one user plane tunnel is established between the CU and a DU1 for the DRB1, and one user plane tunnel is established between the CU and a DU2 for the DRB1. The CU may notify the DU1 and the DU2 that the duplication mode is configured for the DRB1, so that the DU1 or the DU2 further instructs, by using a MAC layer message, the terminal side device to activate or deactivate the duplication mode.

According to the technical solution provided in the first embodiment of this application, a correspondence among an uplink tunnel endpoint, a downlink tunnel point, and a path is established in the duplication mode, and a manner of determining a primary path is explicitly specified. In this way, a duplication mode is implemented for a data radio bearer in a CU-DU architecture.

Figure 5:
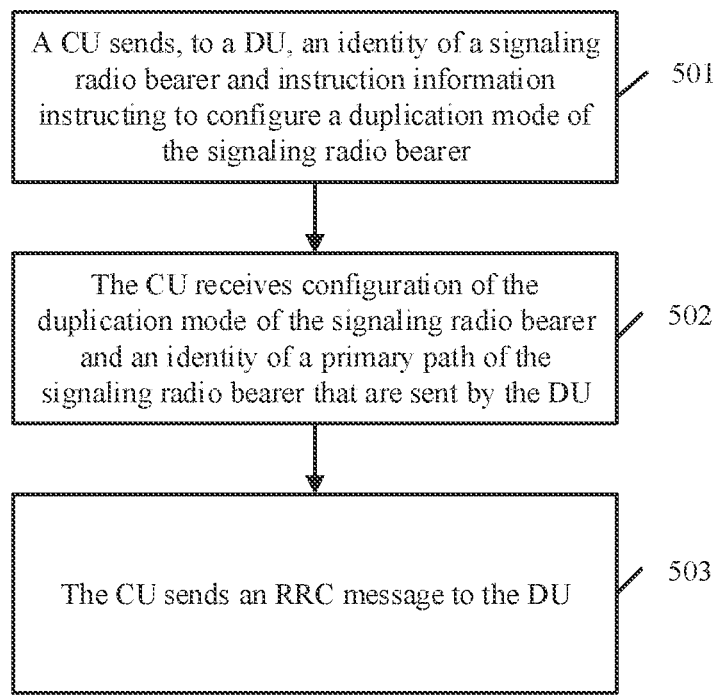
FIG. 5 is a schematic flowchart of a duplication mode communication processing method in a CU-DU architecture according to an embodiment of this application.

A second embodiment of this application provides a communication processing method in a CU-DU architecture, applied to a duplication mode scenario of a signaling radio bearer (SBR) in a CU-DU architecture. FIG. 5 is a schematic flowchart of the communication processing method. The second embodiment of this application includes the following contents.

501. A CU sends, to a DU, an identity of a signaling radio bearer and instruction information used to instruct to configure a duplication mode of the signaling radio bearer.

In 501, the CU determines that the duplication mode of the signaling radio bearer needs to be configured, generates a third message (for example, a UE context setup/modification request), and includes the identity of the signaling radio bearer into the third message and the instruction information instructing to configure the duplication mode of the signaling radio bearer. For example, in the third message, the CU instructs the DU to establish an SRB1 and an SRB2, and instructs the DU to configure a duplication mode of the SRB1. Optionally, the CU may further indicate an active time of the signaling radio bearer, so that the DU activates the signaling radio bearer within the active time.

502. The CU receives configuration of the duplication mode of the signaling radio bearer and an identity of a primary path of the signaling radio bearer that are sent by the DU.

Optionally, the configuration of the duplication mode sent by the DU includes identities of at least two paths of the signaling radio bearer.

Optionally, the identities of the at least two paths of the signaling radio bearer or the identity of the primary path of the signaling radio bearer may be determined by the DU and be notified from the DU to the CU in 502, or may be determined by the CU and notified from the DU to the DU in 501.

In 502, the DU generates a fourth message (for example, a UE context setup/modification response), and carry into the fourth message, configurations of the duplication mode of the signaling radio bearer at an RLC layer, a MAC layer, and a PHY layer, and also carry identities of at least two paths of the signaling radio bearer, to establish the duplication mode of the signaling radio bearer. The configuration of the duplication mode further includes an identity of a cell group corresponding to each path of the signaling radio bearer. The fourth message further includes an identity of a cell group (namely, a primary cell group) corresponding to a primary path of the signaling radio bearer. For example, the DU includes a cell group configuration (CellGroupConfig) into the fourth message, and the cell group configuration includes the identities of the at least two paths of the signaling radio bearer. The fourth message may further include an identity of the primary path, and the identity of the primary path is presented as an individual information element in the fourth message.

For example, the CU obtains the cell group configuration included in the second message sent by the DU, and obtains the cell group identity from the cell group configuration. Particularly, the cell group identity may be presented as an individual information element in the second message, and therefore the CU obtains the cell group identity without reading the cell group configuration. In addition, the CU uses the foregoing method to obtain the identity of the primary path, for example, a logical channel identity of the primary path. The CU adds the cell group identity and the identity of the primary path into the PDCP configuration. The CU generates a radio bearer configuration (RadioBearerConfig), where the radio bearer configuration includes the PDCP configuration. Finally, the CU generates an RRC reconfiguration message, containing the radio bearer configuration and the cell group configuration that is sent by the DU. The CU forwards the RRC reconfiguration message to UE through the DU. After the duplication mode of the signaling radio bearer is configured in 501 and 502, (optionally, within the active time of the duplication mode), the duplication mode is activated. The CU may duplicate a generated RRC message at the PDCP layer, and then send the duplicated RRC message to the DU. After the configuration of the duplication mode is invalid or the active time of the duplication mode expires, the duplication mode is inactive, and the CU no longer duplicates any generated RRC message.

Therefore, based on 501 and 502, the method further includes 503, where the CU sends the RRC message to the DU in the following several possible manners:

503A. The CU sends a fifth message to the DU, where when the duplication mode of the signaling radio bearer is inactive, the fifth message includes one RRC message belonging to the signaling radio bearer; or when the duplication mode of the signaling radio bearer is active, the fifth message includes at least two RRC messages with a same PDCP serial number that belong to the signaling radio bearer.

In 503A, if the message received by the DU on a CU-DU interface includes only one RRC message, for example, if a DL RRC message transfer message includes only one RRC message, the DU sends the only one RRC message to a terminal side device through any one (e.g. the primary path) of the at least two paths. If the message received by the DU on a CU-DU control plane interface includes at least two RRC messages with a same PDCP serial number, the DU sends the at least two RRC messages to the terminal side device through the at least two paths, respectively.

503B. The CU sends a fifth message to the DU, where the fifth message includes at least one RRC message and an identity of a path to which each of the at least one RRC message is sent.

In 503B, the CU may indicate the identity of the path to which each RRC message is sent, so that the DU sends, based on the path identity indicated by the CU, each RRC message to the terminal side device through the path to which the RRC message is sent.

503C. The CU sends a fifth message to the DU, where the fifth message includes an RRC message. The DU determines whether a PDCP serial number of the RRC message is duplicated. If the PDCP serial number is duplicated, the DU sends the RRC message to the terminal side device through a secondary path. If the PDCP serial number is not duplicated, the DU sends the RRC message to the terminal side device through the primary path.

In 503C, the DU may record a PDCP serial number of each RRC message received by the CU, so that when the DU receives a certain RRC message, the DU makes a comparison with the recorded PDCP serial numbers to determine whether the PDCP serial number of the certain RRC message is duplicated.

Further, to make the terminal side device learn of the configuration of the duplication mode, the CU may further generate, based on the configuration of the duplication mode obtained from the DU, configuration information of the duplication mode to be sent to the terminal side device. The method further includes: The CU sends the configuration information of the duplication mode to the terminal side device through the DU, where the configuration information of the duplication mode includes at least one of the following options: the identities of at least two paths of the signaling radio bearer, the identity of the primary path of the signaling radio bearer. The identity of the primary path of the signaling radio bearer may be used as a part of a PDCP layer configuration of the duplication mode. Optionally, the configuration information of the duplication mode further includes an RLC layer configuration, a MAC layer configuration, and a PHY layer configuration, and the like of the duplication mode.

In the technical solution provided in the second embodiment of this application, the CU instructs the DU to configure the signaling radio bearer, thereby obtaining the configuration of the signaling radio bearer made by the DU. In this way, a duplication mode is implemented for a signaling radio bearer in a CU-DU architecture.

Figure 6:
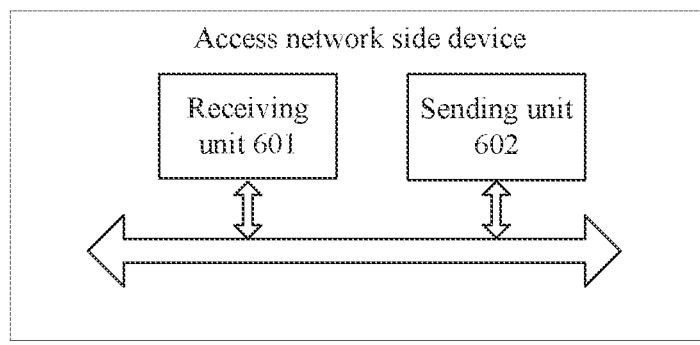
FIG. 6 is a schematic structural diagram of an access network side device according to an embodiment of this application.

A third embodiment of this application provides an access network side device. In a schematic structural diagram of an access network side device shown in FIG. 6, the access network side device includes a receiving unit 601 and a sending unit 602.

The access network side device may be the CU in the first embodiment or a chip in the CU. The sending unit 602 is configured to send a first message to a DU, where the first message comprises information indicating at least two uplink tunnel endpoints, for a duplication mode of a data radio bearer, which are on an interface between the CU and the DU. The receiving unit 601 is configured to receive a second message sent by the DU, where the second message comprises information indicating at least two downlink tunnel endpoints for the data radio bearer, which are on the interface between the CU and the DU, and an identity of a primary path of the data radio bearer. In an implementation, the at least two downlink tunnel endpoints are in a one-to-one correspondence with the at least two uplink tunnel endpoints. In this case, the receiving unit 601 and the sending unit 602 may respectively execute the receiving action and the sending action of the CU in the first embodiment. For details, refer to the actions of the CU in the first embodiment. Details are not described herein again.

The access network side device may be the DU in the first embodiment or a chip in the DU. The receiving unit 601 is configured to receive a first message sent by a CU, where the first message comprises information indicating at least two uplink tunnel endpoints, for a duplication mode of a data radio bearer, which are on an interface between the CU and the DU; and the sending unit 602 is configured to send a second message to the CU, where the second message comprises information indicating at least two downlink tunnel endpoints for the data radio bearer, which are on the interface between the CU and the DU, and an identity of a primary path of the data radio bearer. In an implementation, the at least two downlink tunnel endpoints are in a one-to-one correspondence with the at least two uplink tunnel endpoints. In this case, the receiving unit 601 and the sending unit 602 may respectively execute the receiving action and the sending action of the DU in the first embodiment. For details, refer to the actions of the DU in the first embodiment. Details are not described herein again.

The access network side device may be the CU in the second embodiment or a chip in the CU. The sending unit 602 is configured to send, to a DU, an identity of a signaling radio bearer and instruction information used to instruct to configure a duplication mode of the signaling radio bearer; and the receiving unit 601 is configured to receive configuration of the duplication mode of the signaling radio bearer and an identity of a primary path of the signaling radio bearer that are sent by the DU. In this case, the receiving unit 601 and the sending unit 602 may respectively execute the receiving action and the sending action of the CU in the second embodiment. For details, refer to the actions of the CU in the second embodiment. Details are not described herein again.

The access network side device may be the DU in the second embodiment or a chip in the DU. The receiving unit 601 is configured to receive an identity of a signaling radio bearer and instruction information used to instruct to configure a duplication mode of the signaling radio bearer that are sent by a CU; and the sending unit 602 is configured to send, to the CU, configuration of the duplication mode of the signaling radio bearer and an identity of a primary path of the signaling radio bearer. In this case, the receiving unit 601 and the sending unit 602 may respectively execute the receiving action and the sending action of the DU in the second embodiment. For details, refer to the actions of the CU in the second embodiment. Details are not described herein again.

In a specific implementation, the receiving unit 601 and the sending unit 602 are respectively a receiving circuit and a sending circuit. The access network side device may further include a processing circuit, for example, in a form of at least one processor, to implement generation and processing of the foregoing messages. The access network side device may further include other electronic lines, for example, lines used to connect the receiving circuit and the sending circuit. When the access network side device is a DU, the access network side device may further include a radio frequency antenna, to send various information to a terminal side device.

In another specific implementation, the access network side device may include a processor and a memory. The memory stores code, and when the code is invoked by the processor, the method performed by the CU or the DU in the foregoing method embodiments may be performed. Specifically, the code includes a plurality of data structures, and each data structure is used to implement functions of the foregoing protocol layers. When the access network side device is a CU, a control plane device of a CU, a user plane device of a CU, or a chip in a CU, the data structures included in the code are used to implement at least functions of a PDCP layer. In this case, the receiving unit 601 may be an input interface of the data structures, and the sending unit 602 is an output interface of the data structures. When the access network side device is a DU, a control plane device of a DU, a user plane device of a DU, or a chip in a DU, the data structures included in the code are used to implement at least functions of an RLC layer. The receiving unit 601 may be an input interface of the data structures, and the sending unit is an output interface of the data structures.

A person skilled in the art should understand that the embodiments of the present application may be provided as a method, a system, or a computer program product. Therefore, the present application may use a form of hardware only embodiments, software only embodiments, or embodiments with a combination of software and hardware. Moreover, the present application may use a form of a computer program product that is implemented on one or more chip systems or computer-usable storage media (including but not limited to a disk memory, a CD-ROM, an optical memory, and the like) that include computer-usable program code.

The present application is described with reference to the flowcharts and/or block diagrams of the method, the apparatus (system), and the computer program product according to the embodiments of the present application. It should be understood that computer program instructions may be used to implement each process and/or each block in the flowcharts and/or the block diagrams, or a combination of a process and/or a block in the flowcharts and/or the block diagrams. These computer program instructions may be provided to a general-purpose computer, a special-purpose computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

What is claimed is:

1. A communication method comprising:
   receiving, by a distributed unit (DU) of a base station from a central unit CU of the base station, an identity of a signaling radio bearer and instruction information instructing to configure a duplication mode of the signaling radio bearer;
   sending, by the DU to the CU, configuration of the duplication mode of the signaling radio bearer in response to the instruction information and a logical channel identity of a primary path between at least two logical channels of the signaling radio bearer;
   receiving, by the DU from the CU, a packet data convergence protocol (PDCP) configuration of the signaling radio bearer including the configuration of the duplication mode of the signaling radio bearer and the logical channel identity of the primary path of the signaling radio bearer; and
   sending, by the DU to a terminal device, the PDCP configuration of the signaling radio bearer;
   receiving, from the CU of the base station, a request message, wherein the request message comprises an identifier of a data radio bearer and information indicating at least two uplink general packet radio service (GPRS) tunneling protocol tunnel endpoints associated with an F1 interface between the CU and the DU for a duplication mode of the data radio bearer, wherein the information indicating the at least two uplink GPRS tunneling protocol tunnel endpoints comprises internet protocol (IP) addresses of the at least two uplink GPRS tunnel protocol tunnel endpoints and tunnel endpoint identifiers (TEIDs) of the at least two uplink GPRS tunnel protocol tunnel endpoints;
   sending a response message to the CU, wherein the response message comprises information indicating at least two downlink GPRS tunneling protocol tunnel endpoints associated with the F1 interface between the CU and the DU for the data radio bearer, and a logical channel identity of a primary path between at least two logical channels of the data radio bearer, wherein the information indicating the at least two downlink GPRS tunneling protocol tunnel endpoints comprises IP addresses of the at least two downlink GPRS tunnel protocol tunnel endpoints and TEIDs of the at least two downlink GPRS tunnel protocol tunnel endpoints, wherein the primary path corresponds to a first uplink GPRS tunnel protocol tunnel endpoint of the at least two uplink GPRS tunnel protocol tunnel endpoints;
   receiving, from the CU, a PDCP configuration of the data radio bearer, wherein the PDCP configuration of the data radio bearer comprises the logical channel identity of the primary path between the at least two logical channels of the data radio bearer; and
   sending the PDCP configuration of the data radio bearer to a terminal device.

2. The method according to claim 1, wherein one PDCP entity at a PDCP layer corresponds to at least two radio link control (RLC) entities at an RLC layer for the signal radio bearer, and wherein at least a portion of data on the PDCP entity is transmitted on the at least two RLC entities in duplicate under the duplicate mode of the signal radio bearer.

3. The method according to claim 1, wherein the method further comprises:
   receiving, by the DU from the CU, a CU-DU interface message, wherein when the duplication mode of the signaling radio bearer is inactive, the CU-DU interface message comprises one radio resource control (RRC) message for the signaling radio bearer, and the DU sends the one RRC message to a terminal device through the primary path corresponding to the signaling radio bearer; or
   when the duplication mode of the signaling radio bearer is active, the CU-DU interface message comprises at least two RRC messages with a same PDCP serial number for the signaling radio bearer, and the DU sends the at least two RRC messages to the terminal device through the primary path and at least one secondary path between the at least two logical channels of the signaling radio bearer, respectively.

4. The method according to claim 1, wherein the method further comprises:
   receiving, by the DU from the CU, a CU-DU interface message, wherein the CU-DU interface message comprises at least one radio resource control (RRC) message and an identity of at least one path between the at least two logical channels of the signaling radio bearer that the at least one RRC message is sent.

5. The method according to claim 1, wherein the method further comprises:
   receiving, by the DU from the CU, a CU-DU interface message, wherein the CU-DU interface message comprises an RRC message, wherein
   if a PDCP serial number of the RRC message is duplicated, the DU sends the RRC message to a terminal device through a secondary path between the at least two logical channels of the signaling radio bearer; or
   if a PDCP serial number of the RRC message is not duplicated, the DU sends the RRC message to a terminal device through the primary path corresponding to the signaling radio bearer.

6. A distributed unit (DU) of a base station, comprising:
   at least one processor and a memory storing instructions executable by the at least one processor to cause the DU to perform operations comprising:
   receiving from a central unit (CU) of the base station, an identity of a signaling radio bearer and instruction information instructing to configure a duplication mode of the signaling radio bearer;
   sending to the CU, configuration of the duplication mode of the signaling radio bearer and a logical channel identity of a primary path between at least two logical channels of the signaling radio bearer;
   receiving from the CU, a packet data convergence protocol (PDCP) configuration of the signaling radio bearer including the configuration of the duplication mode of the signaling radio bearer and the logical channel identity of the primary path corresponding to the signaling radio bearer; and
   sending, by the DU to a terminal device, the PDCP configuration of the signaling radio bearer;
   receiving, from the CU of the base station, a request message, wherein the request message comprises an identifier of a data radio bearer and information indicating at least two uplink general packet radio service (GPRS) tunneling protocol tunnel endpoints associated with an F1 interface between the CU and the DU for a duplication mode of the data radio bearer, wherein the information indicating the at least two uplink GPRS tunneling protocol tunnel endpoints comprises internet protocol (IP) addresses of the at least two uplink GPRS tunnel protocol tunnel endpoints and tunnel endpoint identifiers (TEIDs) of the at least two uplink GPRS tunnel protocol tunnel endpoints;
   sending a response message to the CU, wherein the response message comprises information indicating at least two downlink GPRS tunneling protocol tunnel endpoints associated with the F1 interface between the CU and the DU for the data radio bearer, and a logical channel identity of a primary path between at least two logical channels of the data radio bearer, wherein the information indicating the at least two downlink GPRS tunneling protocol tunnel endpoints comprises IP addresses of the at least two downlink GPRS tunnel protocol tunnel endpoints and TEIDs of the at least two downlink GPRS tunnel protocol tunnel endpoints, wherein the primary path corresponds to a first uplink GPRS tunnel protocol tunnel endpoint of the at least two uplink GPRS tunnel protocol tunnel endpoints;
   receiving, from the CU, a packet data convergence protocol (PDCP) configuration of the data radio bearer, wherein the PDCP configuration of the data radio bearer comprises the logical channel identity of the primary path between the at least two logical channels of the data radio bearer; and
   sending the PDCP configuration of the data radio bearer to a terminal device.

7. The DU according to claim 6, wherein one PDCP entity at a PDCP layer corresponds to at least two radio link control (RLC) entities at an RLC layer for the signal radio bearer, and wherein at least a portion of data on the PDCP entity is transmitted on the at least two RLC entities in duplicate under the duplicate mode of the signal radio bearer.

8. The DU according to claim 6, wherein the operations further comprising:
   receiving from the CU, a CU-DU interface message, wherein
   when the duplication mode of the signaling radio bearer is inactive, the CU-DU interface message comprises one radio resource control (RRC) message belonging to the signaling radio bearer, and sending the one RRC message to a terminal device through the primary path corresponding to the signaling radio bearer; or
   when the duplication mode of the signaling radio bearer is active, the CU-DU interface message comprises at least two RRC messages with a same PDCP serial number that belong to the signaling radio bearer, and sending the at least two RRC messages to the terminal device through the primary path and at least one secondary path between the at least two logical channels of the signaling radio bearer, respectively.

9. The DU according to claim 6, wherein the operations further comprising:
   receiving from the CU, a CU-DU interface message, wherein the CU-DU interface message comprises at least one radio resource control (RRC) message and an identity of a path between the at least two logical channels of the signaling radio bearer to which each of the at least one RRC message is sent.

10. The DU according to claim 6, wherein the operations further comprising:

receiving from the CU, a CU-DU interface message, wherein the CU-DU interface message comprises a radio resource control (RRC) message, wherein if a PDCP serial number of the RRC message is duplicated, sending the RRC message to a terminal device through a secondary path between the at least two logical channels of the signaling radio bearer; or if a PDCP serial number of the RRC message is not duplicated, sending the RRC message to a terminal device through the primary path corresponding to the signaling radio bearer.

11. A communication method comprising:

sending, by a central CU of a base station to a distributed unit (DU) of the base station, an identity of a signaling radio bearer and instruction information instructing to configure a duplication mode of the signaling radio bearer;

receiving, by the CU from the DU, configuration of the duplication mode bearer and a logical channel identity of a primary path between at least two logical channels of the signaling radio bearer;

sending, by the CU to a terminal device through the DU, a packet data convergence protocol (PDCP) configuration including the configuration of the duplication mode and the logical channel identity of the primary path corresponding to the signaling radio bearer;

sending, by the CU to the DU, a request message, wherein the request message comprises an identifier of a data radio bearer and information indicating at least two uplink general packet radio service (GPRS) tunneling protocol tunnel endpoints associated with an F1 interface between the CU and the DU for a duplication mode of the data radio bearer, wherein the information indicating the at least two uplink GPRS tunneling protocol tunnel endpoints comprises internet protocol (IP) addresses of the at least two uplink GPRS tunnel protocol tunnel endpoints and tunnel endpoint identifiers (TEIDs) of the at least two uplink GPRS tunnel protocol tunnel endpoints;

receiving, by the CU from the DU, a response message, wherein the response message comprises information indicating at least two downlink GPRS tunneling protocol tunnel endpoints associated with the F1 interface between the CU and the DU for the data radio bearer, and a logical channel identity of a primary path between at least two logical channels of the data radio bearer, wherein the information indicating the at least two downlink GPRS tunneling protocol tunnel endpoints comprises IP addresses of the at least two downlink GPRS tunnel protocol tunnel endpoints and TEIDs of the at least two downlink GPRS tunnel protocol tunnel endpoints, wherein the primary path corresponds to a first uplink GPRS tunnel protocol tunnel endpoint of the at least two uplink GPRS tunnel protocol tunnel endpoints;

sending, by the CU to the DU, a packet data convergence protocol (PDCP) configuration of the data radio bearer, wherein the PDCP configuration of the data radio bearer comprises the logical channel identity of the primary path between the at least two logical channels of the data radio bearer.

12. The method according to claim 11, wherein one PDCP entity at a PDCP layer corresponds to at least two radio link control (RLC) entities at an RLC layer for the signal radio bearer, and wherein at least a portion of data on the PDCP entity is transmitted on the at least two RLC entities in duplicate under the duplicate mode of the signal radio bearer.

13. The method according to claim 11, wherein the method further comprises:

sending, by the CU to the DU, a CU-DU interface message, wherein when the duplication mode of the signaling radio bearer is inactive, the CU-DU interface message comprises one radio resource control (RRC) message for the signaling radio bearer, and the DU sends the one RRC message to a terminal device through the primary path corresponding to the signaling radio bearer; or when the duplication mode of the signaling radio bearer is active, the CU-DU interface message comprises at least two RRC messages with a same PDCP serial number for the signaling radio bearer, and the DU sends the at least two RRC messages to the terminal device through the primary path and at least one secondary path between the at least two logical channels of the signaling radio bearer, respectively.

14. The method according to claim 11, wherein the method further comprises:

sending, by the CU to the DU, a CU-DU interface message, wherein the CU-DU interface message comprises at least one radio resource control (RRC) message and an identity of at least one path between the at least two logical channels of the signaling radio bearer that the at least one RRC message is sent.

15. A central unit (CU) of a base station, comprising:

at least one processor and a memory storing instructions executable by the at least one processor to cause the CU to perform operations comprising:

sending, by a CU of the base station to a distributed unit (DU) of the base station, an identity of a signaling radio bearer and instruction information instructing to configure a duplication mode of the signaling radio bearer;

receiving, by the CU from the DU, configuration of the duplication mode of the signaling radio bearer and a logical channel identity of a primary path between at least two logical channels of the signaling radio bearer;

sending, by the CU to a terminal device through the DU, a packet data convergence protocol (PDCP) configuration of the signaling radio bearer including the configuration of the duplication mode of the signaling radio bearer and the logical channel identity of the primary path;

sending, by the CU to the DU, a request message, wherein the request message comprises an identifier of a data radio bearer and information indicating at least two uplink general packet radio service (GPRS) tunneling protocol tunnel endpoints associated with an F1 interface between the CU and the DU for a duplication mode of the data radio bearer, wherein the information indicating the at least two uplink GPRS tunneling protocol tunnel endpoints comprises internet protocol (IP) addresses of the at least two uplink GPRS tunnel protocol tunnel endpoints and tunnel endpoint identifiers (TEIDs) of the at least two uplink GPRS tunnel protocol tunnel endpoints;

receiving, by the CU from the DU, a response message, wherein the response message comprises information indicating at least two downlink GPRS tunneling protocol tunnel endpoints associated with the F1 interface between the CU and the DU for the data radio bearer, and a logical channel identity of a primary path between at least two logical channels of the data radio bearer, wherein the information indicating the at least two downlink GPRS tunneling protocol tunnel endpoints comprises IP addresses of the at least two downlink GPRS tunnel protocol tunnel endpoints and TEIDs of the at least two downlink GPRS tunnel protocol tunnel endpoints, wherein the primary path corresponds to a first uplink GPRS tunnel protocol tunnel endpoint of the at least two uplink GPRS tunnel protocol tunnel endpoints;

sending, by the CU to the DU, a packet data convergence protocol (PDCP) configuration of the data radio bearer, wherein the PDCP configuration of the data radio bearer comprises the logical channel identity of the primary path between the at least two logical channels of the data radio bearer.

16. The CU according to claim 15, wherein one PDCP entity at a PDCP layer corresponds to at least two radio link control (RLC) entities at an RLC layer for the signal radio bearer, and wherein at least a portion of data on the PDCP entity is transmitted on the at least two RLC entities in duplicate under the duplicate mode of the signal radio bearer.

17. The CU according to claim 15, wherein the operations further comprising:
sending, by the CU to the DU, a CU-DU interface message, wherein
when the duplication mode of the signaling radio bearer is inactive, the CU-DU interface message comprises one radio resource control (RRC) message for the signaling radio bearer, and the DU sends the one RRC message to a terminal device through the primary path corresponding to the signaling radio bearer; or
when the duplication mode of the signaling radio bearer is active, the CU-DU interface message comprises at least two RRC messages with a same PDCP serial number for the signaling radio bearer, and the DU sends the at least two RRC messages to the terminal device through the primary path and at least one secondary path between the at least two logical channels of the signaling radio bearer, respectively.

18. The CU according to claim 15, wherein the operations further comprising:
sending a CU-DU interface message to the DU, wherein the CU-DU interface message comprises at least one radio resource control (RRC) message and an identity of at least one path between the at least two logical channels of the signaling radio bearer that the at least one RRC message is sent.

19. A distributed unit (DU) of a base station, comprising:
at least one processor and a memory storing instructions executable by the at least one processor to cause the DU to perform operations comprising:
receiving, from a central unit (CU) of the base station, a request message, wherein the request message comprises an identifier of a data radio bearer and information indicating at least two uplink general packet radio service (GPRS) tunneling protocol tunnel endpoints associated with an F1 interface between the CU and the DU for a duplication mode of the data radio bearer, wherein the information indicating the at least two uplink GPRS tunneling protocol tunnel endpoints comprises internet protocol (IP) addresses of the at least two uplink GPRS tunnel protocol tunnel endpoints and tunnel endpoint identifiers (TEIDs) of the at least two uplink GPRS tunnel protocol tunnel endpoints;
sending a response message to the CU, wherein the response message comprises information indicating at least two downlink GPRS tunneling protocol tunnel endpoints associated with the F1 interface between the CU and the DU for the data radio bearer, and a logical channel identity of a primary path between at least two logical channels of the data radio bearer, wherein the information indicating the at least two downlink GPRS tunneling protocol tunnel endpoints comprises IP addresses of the at least two downlink GPRS tunnel protocol tunnel endpoints and TEIDs of the at least two downlink GPRS tunnel protocol tunnel endpoints, wherein the primary path corresponds to a first uplink GPRS tunnel protocol tunnel endpoint of the at least two uplink GPRS tunnel protocol tunnel endpoints;
receiving, from the CU, a packet data convergence protocol (PDCP) configuration of the data radio bearer, wherein the PDCP configuration comprises the logical channel identity of the primary path between the at least two logical channels of the data radio bearer; and
sending the PDCP configuration to a terminal device.

20. The DU according to claim 19, wherein the at least two downlink GPRS tunneling protocol tunnel endpoints have a one-to-one correspondence with the at least two uplink GPRS tunneling protocol tunnel endpoints.

21. The DU according to claim 19, wherein one PDCP entity at a PDCP layer corresponds to at least two radio link control (RLC) entities at an RLC layer for the data radio bearer, and wherein at least a portion of data on the PDCP entity is transmitted on the at least two RLC entities in duplicate under the duplicate mode of the data radio bearer.

22. The DU according to claim 19, wherein the logical channel identity of the primary path corresponds to one of the at least two downlink GPRS tunneling protocol tunnel endpoints.

23. A communication method comprising:
sending, by a central unit (CU) of a base station to a distributed unit (DU) of the base station, a request message, wherein the request message comprises an identifier of a data radio bearer and information indicating at least two uplink general packet radio service (GPRS) tunneling protocol tunnel endpoints associated with an F1 interface between the CU and the DU for a duplication mode of the data radio bearer, wherein the information indicating the at least two uplink GPRS tunneling protocol tunnel endpoints comprises internet protocol (IP) addresses of the at least two uplink GPRS tunnel protocol tunnel endpoints and tunnel endpoint identifiers (TEIDs) of the at least two uplink GPRS tunnel protocol tunnel endpoints;
receiving, by the CU from the DU, a response message, wherein the response message comprises information indicating at least two downlink GPRS tunneling protocol tunnel endpoints associated with the F1 interface between the CU and the DU for the data radio bearer, and a logical channel identity of a primary path between at least two logical channels of the data radio bearer, wherein the information indicating the at least two downlink GPRS tunneling protocol tunnel endpoints comprises IP addresses of the at least two downlink GPRS tunnel protocol tunnel endpoints and TEIDs of the at least two downlink GPRS tunnel protocol tunnel endpoints, wherein the primary path corresponds to a first uplink GPRS tunnel protocol tunnel endpoint of the at least two uplink GPRS tunnel protocol tunnel endpoints; and
sending, by the CU to a terminal device through the DU, a packet data convergence protocol (PDCP) configuration of the data radio bearer, wherein the PDCP configuration comprises the logical channel identity of the primary path between the at least two logical channels of the data radio bearer.

24. The method according to claim 23, wherein the at least two downlink GPRS tunneling protocol tunnel endpoints have a one-to-one correspondence with the at least two uplink GPRS tunneling protocol tunnel endpoints.

25. The method according to claim 23, wherein one PDCP entity at a PDCP layer corresponds to at least two radio link control (RLC) entities at an RLC layer for the data radio bearer, and wherein at least a portion of data on the PDCP entity is transmitted on the at least two RLC entities in duplicate under the duplicate mode of the data radio bearer.

26. The method according to claim 23, wherein the logical channel identity of the primary path corresponds to one of the at least two downlink GPRS tunneling protocol tunnel endpoints.

27. A central unit (CU) of a base station, comprising:
at least one processor and a memory storing instructions executable by the at least one processor to cause the CU to perform operations comprising:
sending to a distributed unit (DU) of the base station, a request message, wherein the request message comprises an identifier of a data radio bearer and information indicating at least two uplink general packet radio service (GPRS) tunneling protocol tunnel endpoints associated with an F1 interface between the CU and the DU for a duplication mode of the data radio bearer, wherein the information indicating the at least two uplink GPRS tunneling protocol tunnel endpoints comprises internet protocol (IP) addresses of the at least two uplink GPRS tunnel protocol tunnel endpoints and tunnel endpoint identifiers (TEIDs) of the at least two uplink GPRS tunnel protocol tunnel endpoints;
receiving from the DU, a response message, wherein the response message comprises information indicating at least two downlink GPRS tunneling protocol tunnel endpoints associated with the F1 interface between the CU and the DU for the data radio bearer, and a logical channel identity of a primary path between at least two logical channels of the data radio bearer, wherein the information indicating the at least two downlink GPRS tunneling protocol tunnel endpoints comprises IP addresses of the at least two downlink GPRS tunnel protocol tunnel endpoints and TEIDs of the at least two downlink GPRS tunnel protocol tunnel endpoints, wherein the primary path corresponds to a first uplink GPRS tunnel protocol tunnel endpoint of the at least two uplink GPRS tunnel protocol tunnel endpoints; and
sending to a terminal device through the DU, a packet data convergence protocol (PDCP) configuration of the data radio bearer, wherein the PDCP configuration comprises the logical channel identity of the primary path between the at least two logical channels of the data radio bearer.

28. The CU according to claim 27, wherein the at least two downlink GPRS tunneling protocol tunnel endpoints have a one-to-one correspondence with the at least two uplink GPRS tunneling protocol tunnel endpoints.

29. The CU according to claim 27, wherein one PDCP entity at a PDCP layer corresponds to at least two radio link control (RLC) entities at an RLC layer for the data radio bearer, and wherein at least a portion of data on the PDCP entity is transmitted on the at least two RLC entities in duplicate under the duplicate mode of the data radio bearer.

30. The CU according to claim 27, wherein the logical channel identity of the primary path corresponds to one of the at least two downlink GPRS tunneling protocol tunnel endpoints.

* * * * *

UNITED STATES PATENT AND TRADEMARK OFFICE
CERTIFICATE OF CORRECTION

| | |
|---|---|
| PATENT NO. | : 11,483,883 B2 |
| APPLICATION NO. | : 17/155798 |
| DATED | : October 25, 2022 |
| INVENTOR(S) | : Haiyan Luo et al. |

It is certified that error appears in the above-identified patent and that said Letters Patent is hereby corrected as shown below:

In the Claims

In Column 18, Line 14, In Claim 1, delete "CU" and insert -- (CU) --.

Signed and Sealed this
Eighth Day of August, 2023

Katherine Kelly Vidal
*Director of the United States Patent and Trademark Office*